(12) United States Patent
Li et al.

(10) Patent No.: US 12,209,591 B2
(45) Date of Patent: Jan. 28, 2025

(54) FAN AND CLEANING APPARATUS

(71) Applicant: Beijing Roborock Technology Co., Ltd., Beijing (CN)

(72) Inventors: Changcheng Li, Beijing (CN); Xing Li, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 8 days.

(21) Appl. No.: 18/015,969

(22) PCT Filed: Jun. 17, 2021

(86) PCT No.: PCT/CN2021/100710
§ 371 (c)(1),
(2) Date: Jan. 13, 2023

(87) PCT Pub. No.: WO2022/052551
PCT Pub. Date: Mar. 17, 2022

(65) Prior Publication Data
US 2023/0296101 A1    Sep. 21, 2023

(30) Foreign Application Priority Data

Sep. 14, 2020 (CN) .......................... 202010962035.9

(51) Int. Cl.
*F04D 29/54* (2006.01)
*A47L 5/22* (2006.01)
(Continued)

(52) U.S. Cl.
CPC ................ *F04D 25/06* (2013.01); *A47L 5/22* (2013.01); *A47L 9/0081* (2013.01); *F04D 29/542* (2013.01)

(58) Field of Classification Search
CPC ........ F04D 25/06; F04D 25/08; F04D 29/542; A47L 5/22; A47L 9/0081
See application file for complete search history.

(56) References Cited

U.S. PATENT DOCUMENTS

| | | | |
|---|---|---|---|
| 11,466,693 B2* | 10/2022 | Liu | F04D 25/0606 |
| 2010/0215489 A1* | 8/2010 | Johnson | F04D 29/444 |
| | | | 415/208.2 |

(Continued)

FOREIGN PATENT DOCUMENTS

| | | |
|---|---|---|
| CA | 2328544 A1 | 6/2001 |
| CN | 101963158 A | 2/2011 |

(Continued)

OTHER PUBLICATIONS

International Search Report from PCT/CN2021/100710 dated Sep. 27, 2021.

(Continued)

*Primary Examiner* — Thomas Fink
(74) *Attorney, Agent, or Firm* — Calfee, Halter & Griswold LLP

(57) ABSTRACT

A fan and a cleaning apparatus. The fan comprises: a fluid module for generating and guiding an airflow, the fluid module comprising a diffuser which has a first positioning mechanism; and a stator module detachably connected to the diffuser, the stator module being provided with a second positioning mechanism adaptive to the first positioning mechanism. The fan uses a modular structure, is simple to assemble, and is suitable for mechanical production.

18 Claims, 6 Drawing Sheets

(51) Int. Cl.
    *A47L 9/00*          (2006.01)
    *F04D 25/06*       (2006.01)

(56) References Cited

U.S. PATENT DOCUMENTS

| | | | |
|---|---|---|---|
| 2018/0266438 A1* | 9/2018 | Hayamitsu | F04D 29/5813 |
| 2019/0021561 A1 | 1/2019 | Tatara et al. | |
| 2019/0040874 A1 | 2/2019 | Guo et al. | |
| 2019/0191948 A1* | 6/2019 | Hayamitsu | F04D 25/0606 |
| 2020/0403487 A1* | 12/2020 | Tsuchida | H02K 11/215 |
| 2021/0215159 A1 | 7/2021 | Liu et al. | |
| 2022/0060087 A1* | 2/2022 | Yan | H02K 1/18 |

FOREIGN PATENT DOCUMENTS

| | | | | |
|---|---|---|---|---|
| CN | 204851785 U | | 12/2015 | |
| CN | 109185196 A | * | 1/2019 | F04D 25/0606 |
| CN | 109416055 A | | 3/2019 | |
| CN | 209444615 U | | 9/2019 | |
| CN | 110617230 A | | 12/2019 | |
| CN | 211116721 U | | 7/2020 | |
| CN | 212536158 U | | 2/2021 | |
| CN | 212536246 U | | 2/2021 | |
| CN | 212543466 U | | 2/2021 | |
| JP | 2018084150 A | | 5/2018 | |
| JP | 2018194004 A | * | 12/2018 | |
| WO | WO-2019167153 A1 | * | 9/2019 | A47L 5/28 |

OTHER PUBLICATIONS

First Office Action of CN Application No. 202010962035.9 dated Jun. 29, 2024.
Extended European Search Report of application No. 21865609.8 dated Sep. 16, 2024.

* cited by examiner

FAN AND CLEANING APPARATUS

CROSS-REFERENCE TO RELATED APPLICATION

The present application is the U.S. national phase application of PCT Application No. PCT/CN2021/100710, filed Jun. 17, 2021, which claims priority to a Chinese patent application No. 202010962035.9, filed Sep. 14, 2020, and entitled "FAN AND CLEANING APPARATUS", the entire contents of which are incorporated herein by reference in their entirety.

TECHNICAL FIELD

The present invention relates to the technical field of mechanical design, and in particular to a fan and a cleaning apparatus.

BACKGROUND

A fan is a machine for increasing gas pressure and discharging gas with the input mechanical energy, and belongs to a driven fluid machine. Fan is a habitual abbreviation for gas compression and gas conveying machinery in China. Generally speaking, fans include ventilators, blowers, and wind generators.

The fans are mainly used for ventilation in metallurgy, petrochemical, electric power, urban rail transit, textiles, ships and other fields of the national economy as well as in various places. In addition to traditional application fields, the fans also have great development prospects in more than 20 potential market fields such as comprehensive utilization of coal gangue, technical innovation of a dry process for clinker, and energy saving and comprehensive utilization of resources in metallurgical industry.

Moreover, the fans are also used in people's daily life, for example, in some commonly used household appliances, such as vacuum cleaners. However, the fans used by the existing vacuum cleaner have a complex structure and is cumbersome in assembling, which is not conducive to mechanized production. In addition, the existing fans are noisy, adversely affecting its use.

SUMMARY

An object of the present invention is to provide a fan and a vacuum cleaner to solve the problems of inconvenient assembling and high noise of the fan in the prior art.

In order to solve the above problems, a first aspect of the present invention provides a fan, including: a fluid module configured to generate and guide an airflow, the fluid module including a fan blade and a diffuser, the diffuser having a first a positioning mechanism; and a stator module detachably connected to the diffuser, the stator module being provided with a second positioning mechanism matched with the first positioning mechanism.

Further, the fluid module further includes a plain shaft and a rotor arranged on the plain shaft in a sleeving manner; and the rotor rotates under the driving of the stator module, and accordingly drives the fan blade to rotate, thereby generating the airflow.

Further, the diffuser is an axial diffuser, wherein the axial diffuser includes: an outer cylinder, a main body disposed in the outer cylinder, and a plurality of diffuser vanes; the diffuser vanes connect the outer cylinder and the main body, and divide an annular space between the outer cylinder and the main body into a plurality of diffusion ducts, and the main body has a central shaft hole, and the main body is arranged on the plain shaft in a sleeving manner through the central shaft hole.

Further, the outer diameter of the main body of the axial diffuser is equal to the outer diameter of a motor stator, such that the air flowing out of the diffusion ducts flows through the outside of the motor stator.

Further, the first positioning mechanism is formed by part of the diffuser vanes of the axial diffuser extending along an axial direction of the axial diffuser.

Further, the stator module includes the motor stator provided with the second positioning mechanism matched with the first positioning mechanism.

Further, the motor stator includes an annular stator outer ring and winding coils, wherein a plurality of uniformly distributed stator teeth is connected onto the inner side of the stator outer ring in a circumferential direction, and are arranged along a radial direction of the stator outer ring; and the number of the winding coils corresponds to that of the stator teeth, and each of the stator teeth is sleeved with the winding coil, wherein a yoke of the stator outer ring is provided with the second positioning mechanism matched with the first positioning mechanism.

Further, the second positioning mechanism is formed by the yoke of the stator outer ring recessing inward.

Further, the second positioning mechanism is a positioning groove, wherein a wall surface of the positioning groove is a cylindrical surface, the first positioning mechanism is a semi-cylindrical body, and a cylindrical surface matched with the wall surface of the positioning groove is arranged on the side of the first positioning mechanism close to the positioning groove.

Further, the stator module further includes a printed circuit board (PCB) detachably connected to the motor stator; the two ends of each winding coil extend along an axial direction of the motor stator to the side of the motor stator connected to the PCB; and the PCB is provided with a connection circuit of the winding coils of the same phase, and the winding coils belonging to the same phase are connected through the PCB.

According to another aspect of the present invention, a cleaning device provided with the fan according to any one of the above technical solutions is also provided.

The above technical solution of the present invention has the following beneficial technical effects.

The technical solution adopts a modular structure, such that the assembling is simple, which is suitable for mechanized production.

LIST OF REFERENCE NUMERALS

1: fluid module; 2: stator module; 11: fan blade; 12: diffuser; 13: air inlet hood; 14: rotor; 15: bearing; 16: annular grateless channel; 17: impeller chamber; 18: plain shaft; 21: motor stator; 22: PCB; 121: first positioning mechanism; 122: outer cylinder; 123: main body; 124: diffuser vane; 125: diffusion duct; 126: central shaft hole; 127: connecting hole; 128: first annular protrusion; 131: air inlet; 132: second annular protrusion; 211: second positioning mechanism; 212: connecting column; 213: stator outer ring; 214: stator tooth; 215: winding coil; 216: stator slot; 2131: stator unit; 2141: arc-shaped structure; 2151: first coil; 2152: second coil; 2153: third coil; 2154: fourth coil; 2155: fifth coil; 2156: sixth coil; and 2161: stator slot notch.

DETAILED DESCRIPTION

In order to make the objectives, technical solutions and advantages of the present invention clearer, the present invention will be further described in detail below with reference to the specific embodiments and the accompanying drawings. It should be understood that these descriptions are exemplary only and are not intended to limit the scope of the present invention. Also, in the following description, descriptions of well-known structures and techniques are omitted to avoid unnecessarily obscuring the concepts of the present invention.

Obviously, the described embodiments are some, but not all, embodiments of the present invention. Based on the embodiments of the present invention, all other embodiments obtained by those of ordinary skill in the art without creative efforts shall fall within the scope of protection of the present invention.

In addition, the technical features involved in the different embodiments of the present invention described below can be combined with each other as long as they do not conflict with each other.

Figure 1:
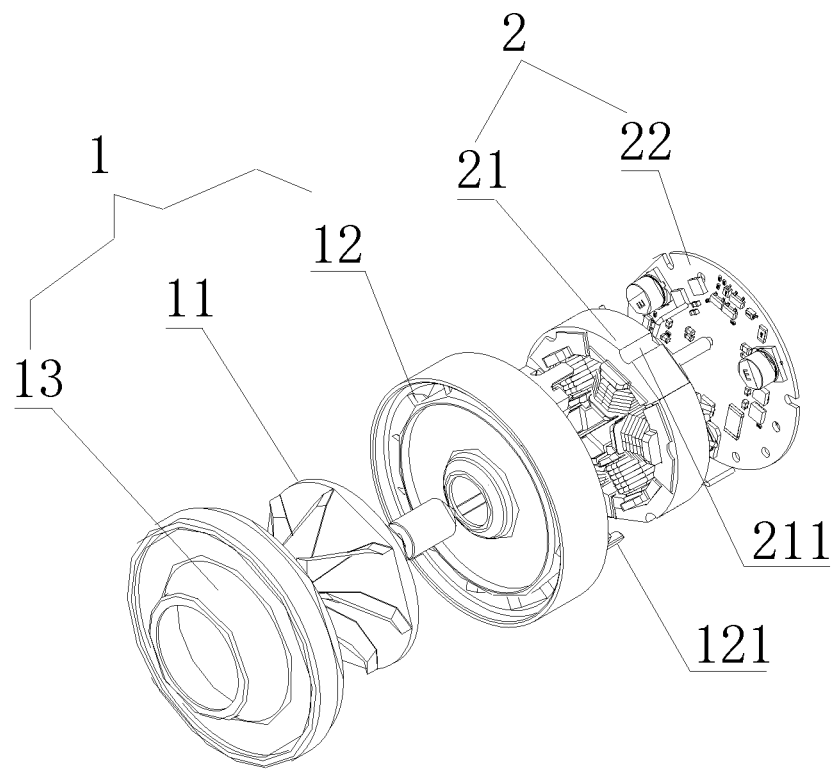
FIG. 1 is a schematic structural diagram of a fan according to a first embodiment of the present invention.
Figure 2:
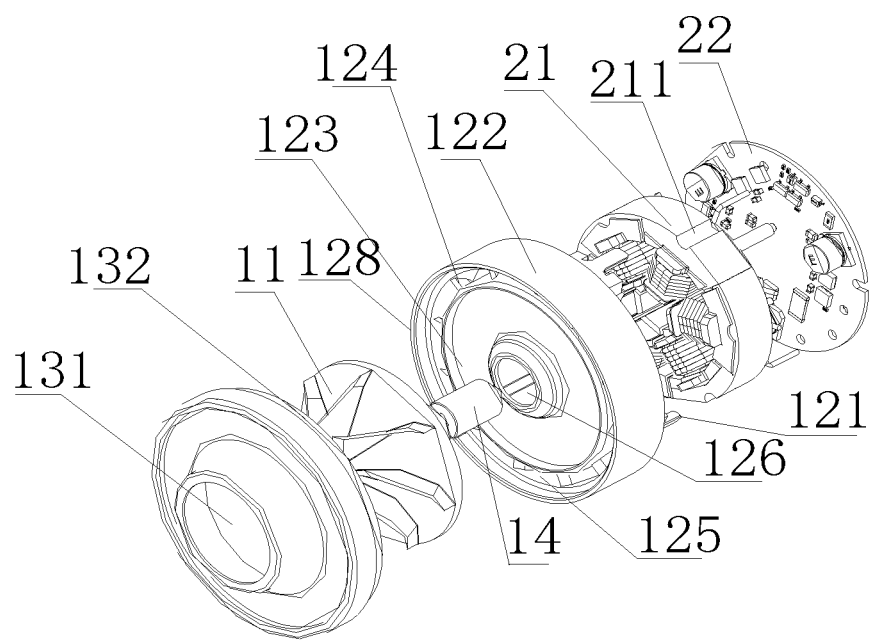
FIG. 2 is a schematic exploded view of the structure of a fan according to an optional embodiment of the present invention.
Figure 3:
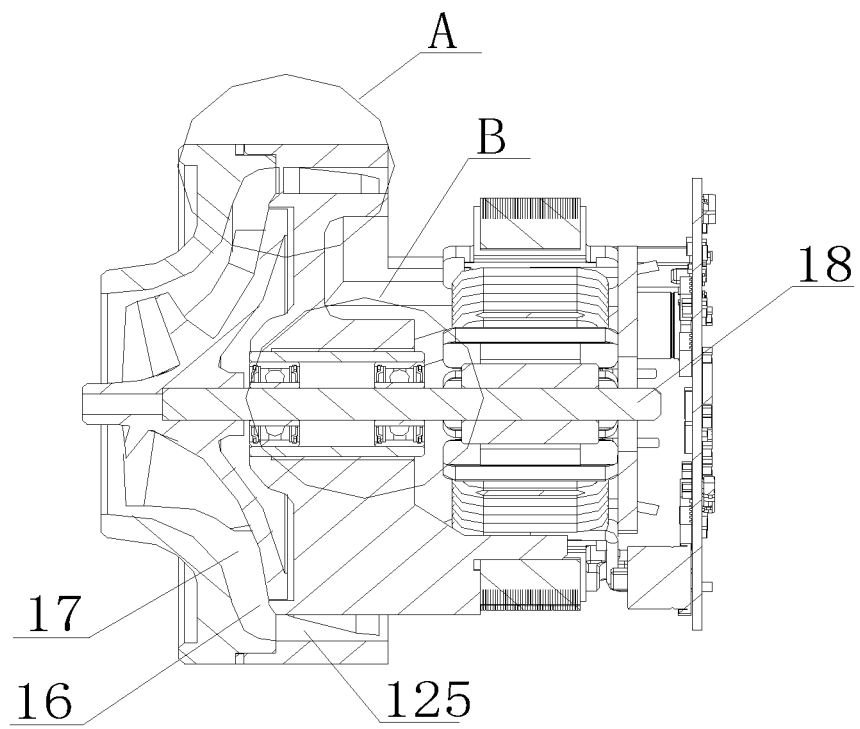
FIG. 3 is a schematic cross-sectional structure diagram of a fan according to an optional embodiment of the present invention.
Figure 4:
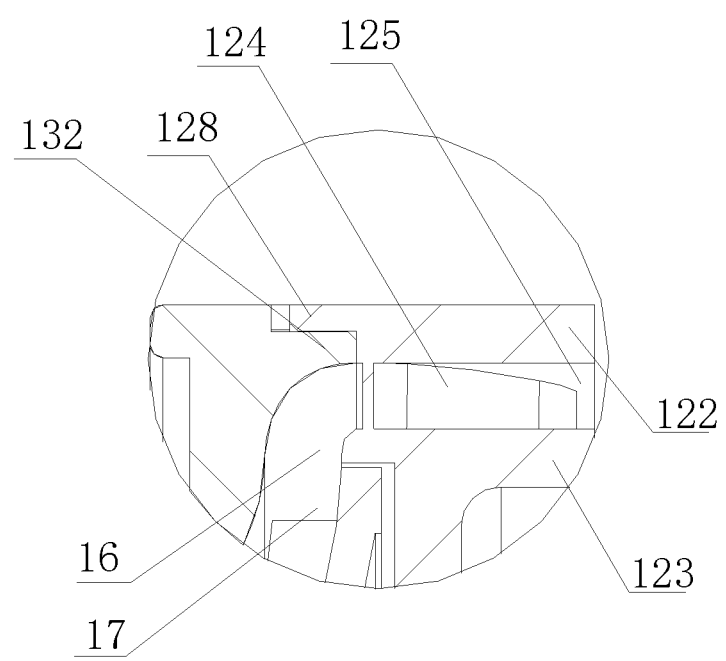
FIG. 4 is an enlarged view of A part in FIG. 3.
Figure 5:
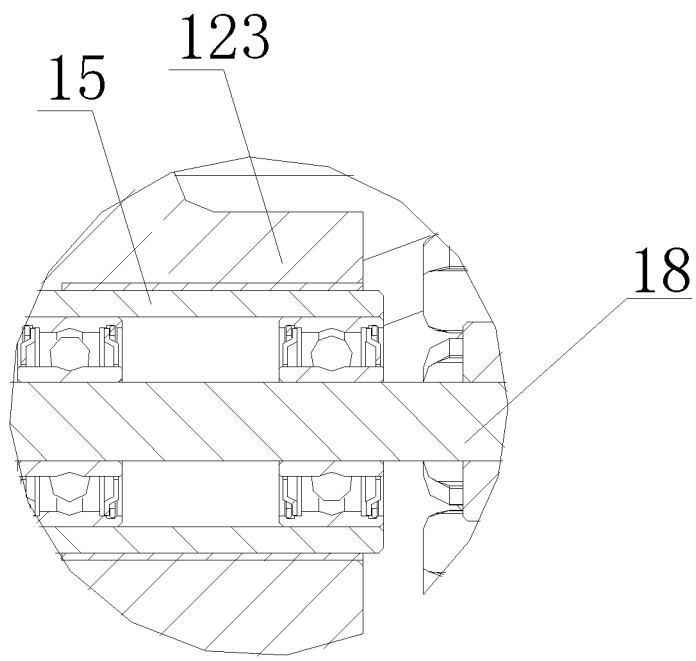
FIG. 5 is an enlarged view of B part in FIG. 3.
Figure 6:
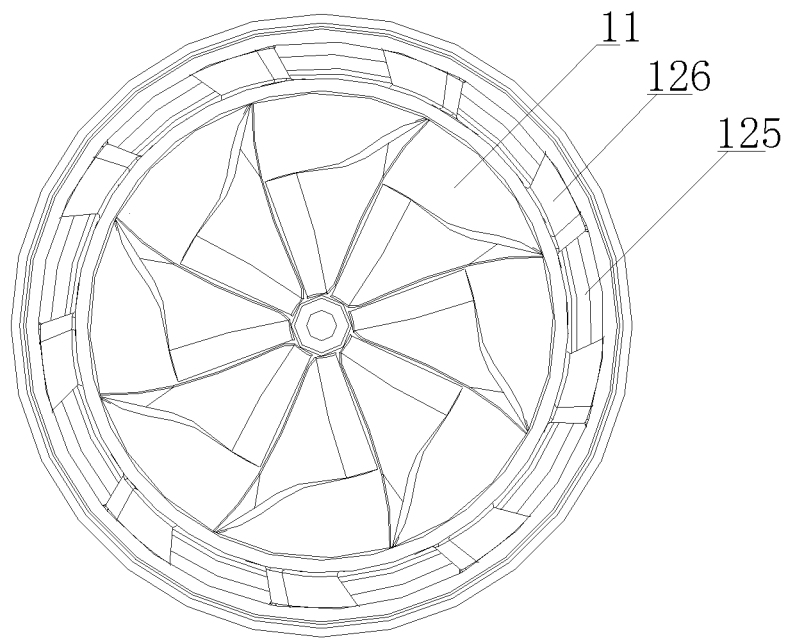
FIG. 6 is a schematic end view showing assembling of fan blades and a diffuser in a fan according to an optional embodiment of the present invention.
Figure 7:
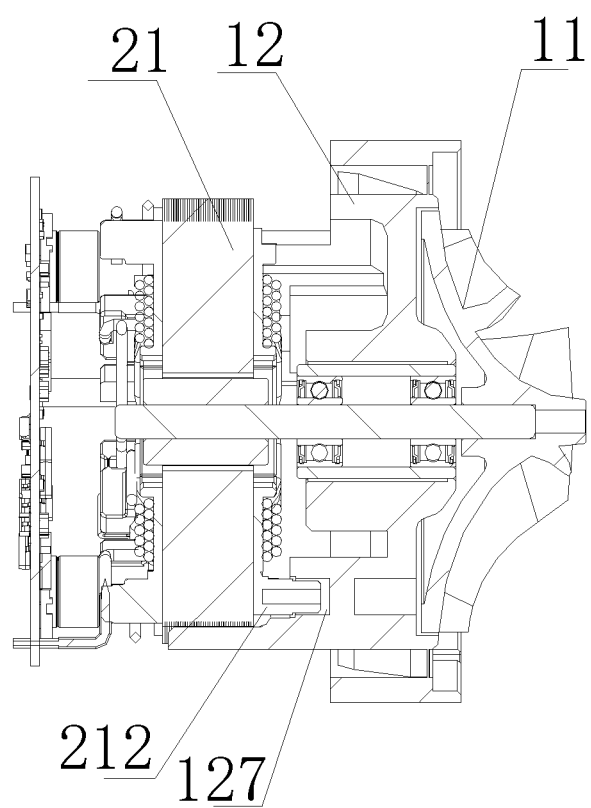
FIG. 7 is a schematic cross-sectional structure diagram of a fan according to an optional embodiment of the present invention.
Figure 8:
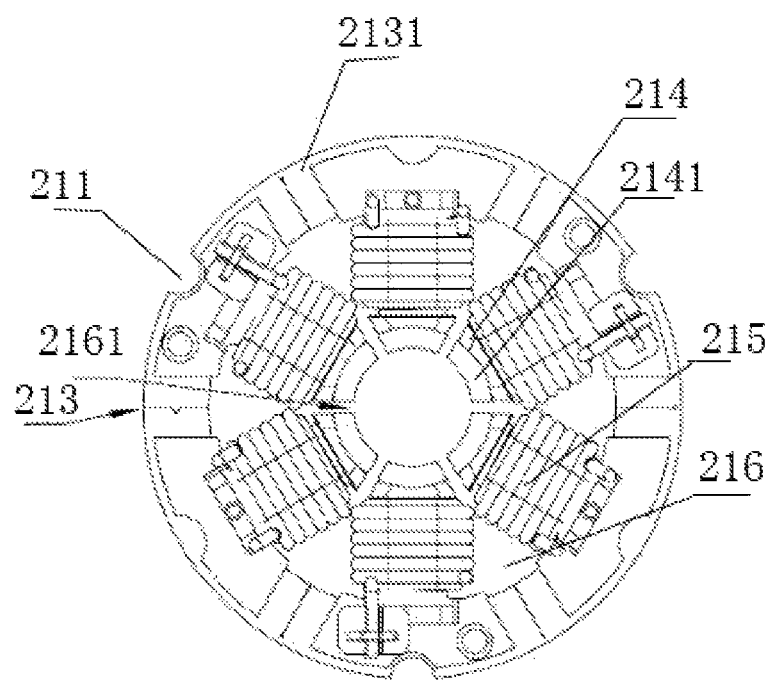
FIG. 8 is a schematic structural diagram of a motor stator according to an optional embodiment of the present invention.
Figure 9:
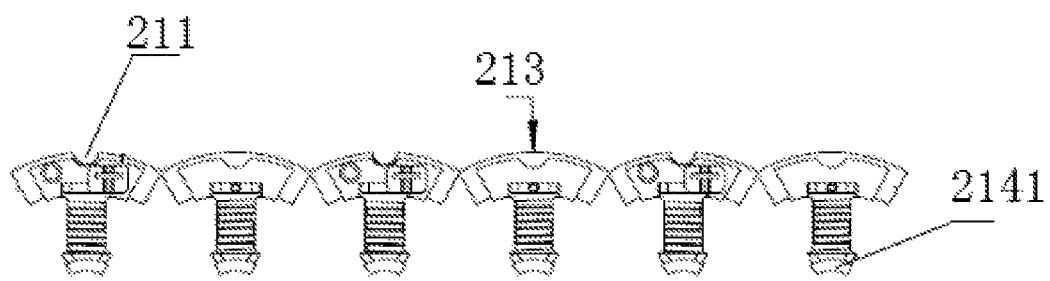
FIG. 9 is a schematic structural diagram of a chain-connected stator unit according to an optional embodiment of the present invention.
Figure 10:
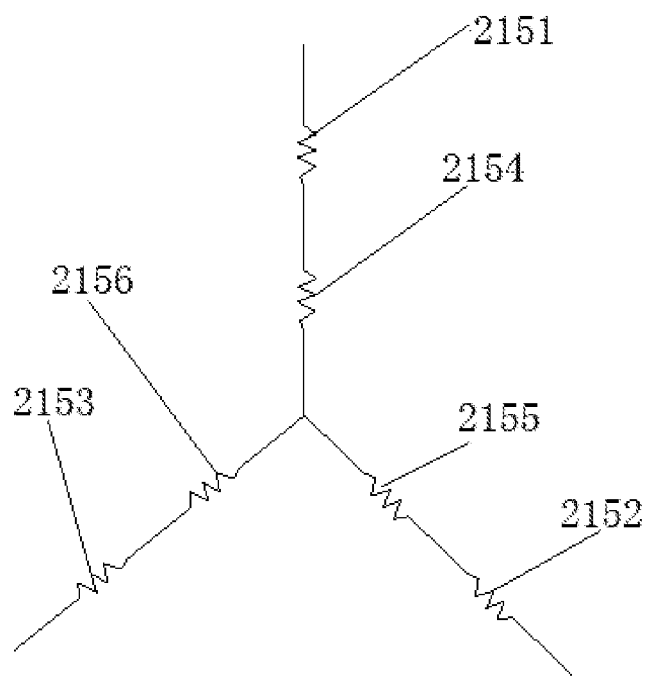
FIG. 10 is a schematic circuit diagram of a 3-phase motor stator according to an optional embodiment of the present invention.
Figure 11:
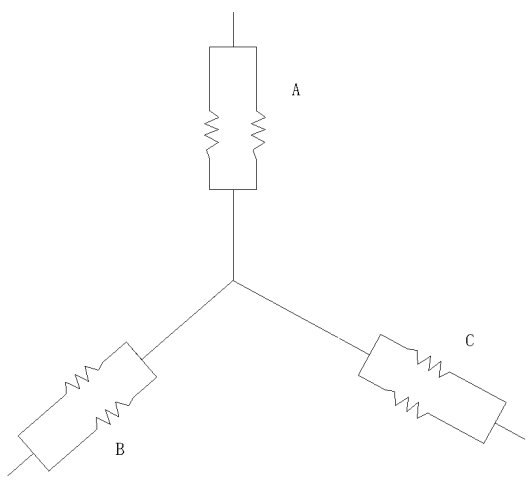
FIG. 11 is a schematic circuit diagram of a 3-phase motor stator according to an optional embodiment of the present invention.

As shown in FIG. 1, in a first aspect of embodiments of the present invention, a fan is provided, including: a fluid module 1 configured to generate and guide an airflow, the fluid module 1 including fan blades 11 and a diffuser 12, the diffuser 12 having a first positioning mechanism 121; and a stator module 2 detachably connected to the diffuser 12, the stator module 2 being provided with a second positioning mechanism 211 matched with the first positioning mechanism 121.

As shown in FIGS. 2 to 7, in an optional embodiment of the present invention, the fluid module 1 further includes a plain shaft 18 and a rotor 14 arranged on the plain shaft 18 in a sleeving manner. The rotor 14 rotates under the driving of the stator module 2, and accordingly drives the fan blades 11 to rotate, thereby generating the airflow. The rotor 14 is a permanent magnet with two poles.

Optionally, the diffuser 12 is an axial diffuser 12. The axial diffuser 12 includes an outer cylinder 122, a main body 123 arranged in the outer cylinder 122, and a plurality of diffuser vanes 124. The diffuser vanes 124 connect the outer cylinder 122 and the main body 123, and divide an annular space between the outer cylinder 122 and the main body 123 into a plurality of diffusion ducts 125. The main body 123 has a central shaft hole 126. The main body 123 is arranged on the plain shaft 18 in a sleeving manner through the central shaft hole 126. In the fan according to the embodiments of the present disclosure, radial diffusion is cancelled, and the axial diffuser 12 is adopted. A chaotic airflow from the fan blades 11 passes through the annular grateless channel 16 and directly enters the axial diffuser 12, and is guided by the diffuser vanes 124 of the axial diffuser 12. After that, the flow of the airflow tends to be stable, which reduces the generation of vortices in the flow channel. By cancelling the radial diffusion, wind resistance can be effectively reduced, thereby reducing energy loss, and improving the working efficiency of the fan. By increasing a "dynamic and static gap", a "dynamic and static interference" effect of the fan in use is weakened, and the noise of the fan is reduced. A radial diffuser 12 is generally provided with radial diffuser vanes at the position of the annular grateless channel 16 of the present disclosure to form radial ducts, which are often very close to the blades. The airflows out from the fan blades 11 and then directly hit the leading edges of the radial diffuser vanes 124, causing a severe "dynamic and static interference". A large number of documents have proved that the "dynamic and static interference" generated by the rotor 14 and the vanes of the motor stator 21 is a main factor causing the fan noise. The fan according to the embodiment of the present disclosure cancels the radial diffuser 12, and adopts the axial diffuser 12 to increase the "dynamic and static gap", which is a very effective way to reduce the noise of the fan. Due to the elimination of the radial diffuser 12, the diameter of the fan can be reduced accordingly. Thus, it avoids problems such as shortening the service life of a bearing 15 and increasing the noise of the fan caused by increase of the power along with the increase of the diameter of the fan.

Optionally, the fluid module 1 further includes an air inlet hood 13. The air inlet hood 13 is fixedly connected to the axial diffuser 12, wherein a fan blade chamber and an annular grateless channel 16 surrounding the fan blade chamber are formed between the air inlet hood 13 and the axial diffuser 12. The annular grateless channel 16 enables the fan blade chamber to communicate with the diffusion ducts 125, and the air inlet hood 13 has an air inlet 131. The fan blades 11 are arranged in the fan blade chamber, and are configured to introduce air from the air inlet 131; and the air is driven by the fan blades 11 to enter the diffusion ducts 125 through the annular grateless channel 16, and flows out from the other ends of the diffusion ducts 125.

Optionally, the outer diameter of the main body 123 of the axial diffuser 12 is equal to the outer diameter of the motor stator 21, such that the air flowing out from the diffusion ducts 125 flows through the outside of the motor stator 21. In the embodiment of the present disclosure, the outer diameter of the main body 123 of the axial diffuser 12 is equal to the outer diameter of the motor stator 21, such that the fluid can flow out from the axial diffuser 12 through the outer ring of the motor stator 21 without obstacles. Flowing through the outside of the motor stator 21 reduces wind resistance and improves fluid efficiency. In the embodiment of the present disclosure, the outer diameter of the main body 123 of the axial diffuser 12 being equal to the outer diameter of the motor stator 21 does not mean that they are absolutely equal, and an error therebetween is allowable. For example, the error between the two is 1%, 3%, 5%, 7%, 10%, etc.

Optionally, a first annular protrusion 128 is arranged on an end face of the outer cylinder 122 close to the air inlet hood 13, such that the end face of the outer cylinder 122 forms a first stepped face, and a side of an outer wall surface of the outer cylinder 122 extends axially to form the annular protrusion. The air inlet hood 13 has a second annular protrusion 132, such that an end face of the air inlet hood 13 connected to the outer cylinder 122 forms a second stepped face matched with the first stepped face. Stepped faces are provided at the place where the outer cylinder 122 is connected to the air inlet hood 13, such that the transition of the inner wall surface of the place where the air inlet hood 13 and the outer cylinder 122 are connected can be smoother, thereby reducing interference to the fluid.

Optionally, the number of the fan blades 11 is an odd number. For example, the number of the fan blades 11 is 3, 5, 7, 9, 11 and so on. The number of the fan blades 11 being an odd number can reduce asymmetric residual stress of injection molding and reduce resonance.

Optionally, the number of the fan blades 11 and the number of the diffuser vanes 124 are not multiples of each other. The number of the diffuser vanes 124 may be a number that cannot be divided by the number of the fan blades 11, such that air noise can be reduced. For example, the number of the fan blades 11 is 7, and the number of the diffuser vanes 124 is 12.

Optionally, the number of the diffuser vanes 124 is a multiple of 3. The number of the diffuser vanes 124 being a multiple of 3 facilitates the set of positioning columns. Three positioning columns can ensure the positioning of the axial diffuser 12 and the motor stator 21. The positioning columns are uniformly distributed on the circumference, and are assembled by using the assembling of the axial diffuser 12 and the motor stator 21. When the positioning columns are formed by the extension of the diffuser vanes 124, the number of the diffuser vanes 124 being a multiple of 3 can ensure the uniform distribution of the positioning columns. The number of the diffuser vanes 124 may be, for example, 9, 12, 15, or the like. Of course, in the embodiment of the present disclosure, it is not excluded that the number of the diffuser vanes 124 is a number other than a multiple of 3.

Optionally, the number of the fan blades 11 is less than the number of the diffuser vanes 124. While the number of the fan blades 11 satisfies the requirement of air extraction efficiency, the number of the diffuser vanes 124 also satisfies the requirement of the rectification efficiency. In some embodiments, the number of the fan blades 11 is 9, and the number of the diffuser vanes 124 is 12.

Optionally, the diffuser vanes 124 may be inclined. That is, the diffuser vanes 124 are not parallel to the axis of the axial diffuser 12. The axis of the diffusion duct 125 is not parallel to the axis of the axial diffuser 12 either. In an exemplary embodiment, an included angle formed between the axis of the diffusion duct 125 and the axis of the axial diffuser 12 may be 10° to 45°.

Optionally, the axial diffuser 12 is assembled on the motor shaft through the bearing 15. The fan blades 11 are fixed on the motor. The fan in the cleaning device such as the vacuum cleaner according to the embodiment of the present disclosure cancels the radial diffusion, and adopts the axial diffuser 12. The chaotic airflow from the fan blades 11 passes through the annular grateless channel 16 and directly enters the axial diffuser 12, and is guided by the diffuser vanes 124 of the axial diffuser 12. After that, the flow of the airflow tends to be stable, which reduces the generation of vortices in the flow channel. By cancelling the radial diffusion, wind resistance can be effectively reduced, thereby reducing energy loss, and improving the working efficiency of the fan. By increasing a "dynamic and static gap", a "dynamic and static interference" effect of the fan in use is weakened, and the noise of the fan is reduced. A radial diffuser 12 is generally provided at the position of the annular grateless channel 16, which are often very close to the vanes. The airflows out from the fan blades 11 and then directly hit the leading edges of the radial diffuser vanes 124, causing a severe "dynamic and static interference". A large number of documents have proved that the "dynamic and static interference" generated by the rotor 14 and the vanes of the motor stator 21 is a main factor causing the fan noise. The fan of the cleaning device such as the vacuum cleaner according to the embodiment of the present disclosure cancels the radial diffuser 12, and adopts the axial diffuser 12 to increase the "dynamic and static gap", which is a very effective way to reduce the noise of the fan. Due to the elimination of the radial diffuser 12, the diameter of the fan can be reduced accordingly. Thus, it avoids the problems such as shortening the service life of the bearing 15 and increasing the noise of the fan caused by increase the power along with the increase of the diameter of the fan.

Optionally, the first positioning mechanism 121 is formed by part of the diffuser vanes 124 of the axial diffuser 12 extending along an axial direction of the axial diffuser 12.

Optionally, the stator module 2 includes the motor stator 21 provided with the second positioning mechanism 211 matched with the first positioning mechanism 121.

Optionally, the motor stator 21 includes an annular stator outer ring 213 and winding coils 215, wherein a plurality of uniformly distributed stator teeth 214 is connected onto the inner side of the stator outer ring 213 in a circumferential direction, and is arranged along a radial direction of the stator outer ring 213. The number of the wind coil 215 corresponds to the number of the stator teeth 214, and each stator tooth 214 is sleeved with one wind coil 215, wherein a yoke of the stator outer ring 213 is provided with the second positioning mechanism 211 matched with the first positioning mechanism 121.

Optionally, the second positioning mechanism 211 is formed by the yoke of the stator outer ring 213 recessing inward.

Optionally, the first positioning mechanism and the second positioning mechanism 211 may be a positioning member and a fastener that form a snap-fit structure, or may be a bolt and a threaded hole that form a threaded connection, or may be a positioning column and a positioning hole in the above embodiment.

Optionally, one of the axial diffuser 12 and the motor stator 21 includes a plurality of positioning columns, and the other of the axial diffuser 12 and the motor stator 21 includes a plurality of positioning holes matched with the positioning columns. By arranging the positioning columns and the positioning holes on the axial diffuser 12 and the motor stator 21 respectively, the connection and fixation of the axial diffuser 12 and the motor stator 21 are convenient. The positioning columns may be provided on either of the axial diffuser 12 and the motor stator 21, and the positioning holes are formed on the other. For example, the positioning columns may be provided on the axial diffuser 12, and the positioning holes are formed on the motor stator 21.

Optionally, the positioning columns extend along the axial direction of the axial diffuser 12. In an exemplary embodiment, part of the diffuser vanes 124 of the axial diffuser 12 extend along the axial direction of the axial diffuser 12 to form positioning columns, and the motor stator 21 includes the positioning holes. The number of the positioning columns is different from the number of the diffuser vanes 124. In general, the number of the positioning columns may be less than the number of the diffuser vanes 124. Therefore, when the positioning columns are arranged on the axial diffuser 12, part of the diffuser vanes 124 can extend along the axial direction to form the positioning columns. For example, 3 of the 12 diffuser vanes 124 extend axially to form the positioning columns. In the embodiment of the present disclosure, the diffuser vanes 124 extend along the axial direction of the axial diffuser 12 to form the positioning columns, which can make the positioning columns have sufficient strength without affecting the structure of the axial diffuser 12, and can reduce material consumption. Thus, the need to increase the thickness of the place where the positioning columns are disposed in order to improve the strength of the positioning columns is avoided. In an exemplary embodiment, the whole ends of the diffuser vanes 124 may extend along the axial direction of the axial diffuser 12 to form the positioning columns. It is also possible that part of the ends of the diffuser vanes 124 extends along the axial direction of the axial diffuser 12 to form the positioning columns. For example, when part of the ends of the diffuser vanes 124 extends along the axial direction of the axial diffuser 12 to form the positioning columns, the sides of the diffuser vanes 124 close to the main body 123 may extend along the axial direction of the axial diffuser 12 to form the positioning columns.

Optionally, the positioning columns may be formed on the main body 123. In an exemplary embodiment, the positioning columns may be disposed at positions of the main body 123 corresponding to the diffuser vanes 124.

Optionally, one positioning column may be formed partly on the main body 123 and formed partly by the extension of the diffuser vanes 124.

In the above embodiment, the positioning hole may be a hole slot or an open slot. In some embodiments, the peripheral surface of the motor stator 21 is recessed inward to form the positioning holes. The peripheral surfaces of the positioning holes are recessed inward to form the open slots, which not only ensures stable positioning, but also saves materials while ensuring strength. The wall surfaces of the positioning holes are cylindrical surfaces, and the positioning columns have cylindrical surfaces matched with the wall surfaces of the positioning holes. The wall surfaces of the positioning holes and the corresponding adapted surfaces of the positioning columns being cylindrical surfaces can effectively ensure the stability of the combination of the two.

Optionally, the positioning column is a semi-cylinder. One side of the positioning column has a cylindrical surface matched with the wall surface of the positioning hole, and the other side is matched with the peripheral surface of the motor stator 21. In the embodiment of the present disclosure, the positioning hole may be disposed at any position on the peripheral surface of the motor stator 21. In some embodiments, the positioning hole is disposed on the peripheral surface corresponding to the tooth centerline of the motor stator 21. The positioning hole is formed on the peripheral surface opposite to the teeth of the motor stator 21. There is enough space for disposing positioning holes in this part, and the strength is ensured, without increasing the thickness and other dimensions of the part where the positioning holes are disposed. Thus, it avoids the increase of the material consumption. In the embodiment of the present disclosure, the number of the positioning holes and the number of the positioning columns are not specifically limited, for example, they may be 2, 3, 4, etc. In some embodiments, there are three positioning holes and three positioning columns respectively, and the positioning holes and positioning columns are uniformly distributed on the respective circumferences. Three positioning holes and three positioning columns respectively can ensure the positioning connection between the axial diffuser 12 and the motor stator 21. The positioning holes are distributed on a circumference. The positioning columns are also distributed evenly on a circumference. The diameters of the two circumferences are the same. The positioning holes and the positioning columns are uniformly distributed on their respective circumferences. When the axial diffuser 12 and the motor stator 21 are connected, it is not necessary to limit the two in a specific orientation. Any positioning column can be matched with any positioning hole. In the embodiment of the present disclosure, the method of the fixed connection between the axial diffuser 12 and the motor stator 21 is not limited. For example, the axial diffuser 12 and the motor stator 21 may be bonded by glue, or connected by an interference fit, or connected by a screw or the like.

Optionally, one of the axial diffuser 12 and the motor stator 21 includes a plurality of connecting columns 212, and the other one of the axial diffuser 12 and the motor stator 21 includes a plurality of connecting holes 127 matched with the connecting columns 212. The axial diffuser 12 and the motor stator 21 are connected to each other by the cooperating of the connecting columns 212 and the connecting holes 127. For example, the connecting columns 212 and the hole walls of the connecting holes 127 are fixedly connected by glue. In this way, glue can be applied in a specific position to avoid defects such as glue overflow. Alternatively, the connecting columns 212 and the connecting holes 127 are fixedly connected by interference fit. In an exemplary embodiment, the axial diffuser 12 includes a plurality of connecting holes 127, and the motor stator 21 includes a plurality of connecting columns 212 matched with the connecting holes 127. For example, the connecting holes 127 may be formed on the main body 123. In the fan according to the embodiment of the present disclosure, both corresponding connecting columns 212 and connecting holes 127 and corresponding positioning columns and positioning holes may be included.

Optionally, the axis lines of the circles where the corresponding connecting columns 212 and connecting holes 127 are disposed are collinear with the axis lines of the circles where the corresponding positioning columns and positioning holes are disposed. In an exemplary embodiment, the radii of the circles where the corresponding connecting columns 212 and connecting holes 127 are disposed may be smaller than the radii of the circles where the corresponding positioning columns and positioning holes are disposed.

Optionally, the length of the connecting column 212 is less than the length of the positioning column. During assembling, the positioning of the axial diffuser 12 and the motor stator 21 can be achieved through the cooperation of the positioning columns and the positioning holes, such that the connecting columns 212 correspond to the connecting holes 127 for easy assembling.

Optionally, one of the axial diffuser 12 and the motor stator 21 includes a plurality of positioning columns, and the other of the axial diffuser 12 and the motor stator 21 includes a plurality of positioning holes matched with the positioning columns. By arranging the positioning columns and the positioning holes on the axial diffuser 12 and the motor stator 21 respectively, the connection and fixation of the axial diffuser 12 and the motor stator 21 are convenient. The positioning columns may be provided on either of the axial diffuser 12 or the motor stator 21, and the positioning holes are formed on the other. For example, the positioning columns may be provided on the axial diffuser 12, and the positioning holes are formed on the motor stator 21.

Optionally, the positioning columns extend along the axial direction of the axial diffuser 12. In an exemplary embodiment, part of the diffuser vanes 124 of the axial diffuser 12 extend along the axial direction of the axial diffuser 12 to form the positioning columns, and the motor stator 21 includes the positioning holes. The number of the positioning columns is different from the number of the diffuser vanes 124. In general, the number of the positioning columns may be less than the number of the diffuser vanes 124. Therefore, when the positioning columns are arranged on the axial diffuser 12, part of the diffuser vanes 124 may extend along the axial direction to form the positioning columns. For example, 3 of the 12 diffuser vanes 124 extend axially to form the positioning columns. In the embodiment of the present disclosure, the diffuser vanes 124 extend along the axial direction of the axial diffuser 12 to form the positioning columns, which can make the positioning columns have sufficient strength without affecting the structure of the axial diffuser 12, and can reduce material consumption. Thus, the need to increase the thickness of the place where the positioning columns are disposed in order to improve the strength of the positioning columns is avoided. In an exemplary embodiment, the whole ends of the diffuser vanes 124 may extend along the axial direction of the axial diffuser 12 to form the positioning columns. It is also possible that part of the ends of the diffuser vanes 124 extends along the axial direction of the axial diffuser 12 to form the positioning columns. For example, when part of the ends of the diffuser vanes 124 extends along the axial direction of the axial diffuser 12 to form the positioning columns, the sides of the diffuser vanes 124 close to the main body 123 may extend along the axial direction of the axial diffuser 12 to form the positioning columns.

Optionally, the positioning columns may be formed on the main body 123. In an exemplary embodiment, the positioning columns may be disposed at positions of the main body 123 corresponding to the diffuser vanes 124.

Optionally, one positioning column may be formed partly on the main body 123 and formed partly by the extension of the diffuser vanes 124. In the above embodiments of the present disclosure, the positioning hole may be a hole slot or an open slot. In some embodiments, the peripheral surface of the motor stator 21 is recessed inward to form the positioning holes. The peripheral surfaces of the positioning holes are recessed inward to form the open slots, which not only ensures stable positioning, but also saves materials while ensuring strength. The wall surfaces of the positioning holes are cylindrical surfaces, and the positioning columns have cylindrical surfaces matched with the wall surfaces of the positioning holes. The wall surfaces of the positioning holes and the corresponding adapted surfaces of the positioning columns being cylindrical surfaces can effectively ensure the stability of the combination of the two.

Optionally, the axis lines of the circles where the corresponding connecting columns 212 and connecting holes 127 are disposed are collinear with the axis lines of the circles where the corresponding positioning columns and positioning holes are disposed. In an exemplary embodiment, the radii of the circles where the corresponding connecting columns 212 and connecting holes 127 are disposed may be smaller than the radii of the circles where the corresponding positioning columns and positioning holes are disposed.

Optionally, the length of the connecting column 212 is less than the length of the positioning column. During assembling, the positioning of the axial diffuser 12 and the motor stator 21 can be achieved through the cooperation of the positioning columns and the positioning holes, such that the connecting columns 212 correspond to the connecting holes 127 for easy assembling.

As shown in FIGS. 8 to 11, in an optional embodiment of the present invention, the stator teeth 214 are arranged along the radial direction of the stator outer ring 213. The outside of each stator tooth 214 is provided with a winding coil 215 in a sleeving manner. The winding coil 215 is provided with only two ends that are connected to a positive electrode and a negative electrode of a power supply, respectively. In other words, in this embodiment, the span of the winding coil 215 is equal to 1. The winding coil 215 adopting a span of 1 tooth can improve the production efficiency. The coil is bundled on one tooth, which can improve the rigidity of both the coil and the iron core and reduce noise.

Optionally, one end of the stator teeth 214 away from the stator outer ring 213 is recessed inward to form an arc-shaped structure. The arc-shaped structures of two adjacent stator teeth 214 are not connected, such that two adjacent stator teeth 214 and the stator outer ring 213 form a stator slots 216, the arc-shaped structures of two adjacent stator teeth 214 are separated by a predetermined distance in the circumferential direction, and the space between the two arc-shaped structures in the circumferential direction is the notch of the stator slot 216.

It can be understood that, in the prior art, for coils with a span greater than 1, it is required to prepare the winding coil 215 according to a predetermined number of turns during assembling of the stator, and then insert the winding coil 215 into the stator slot 216, instead of directly sleeving the stator teeth 214 with the coil. For example, for coils with a span of 2, a first coil 2151 has only one end which is connected to the positive electrode, and a fourth coil also has only one end which is connected to the negative electrode. After the coils are assembled, it is also required to connect the positive electrode of the first coil to the fourth coil across two coils, which will cause relatively long invalid copper wire, resulting in waste of copper wire, high resistance, high copper loss, and low efficiency.

After a lot of research, the inventor has determined that for the winding coil 215 with a span of 1, although the winding coefficient is low, that is, the output torque of this coil is small under the same current. However, the span is 1, that is, the winding coil 215 has two ends which are respectively connected to the positive electrode and the negative electrode, thus, the ineffective copper wire at the end of the winding coil 215 is short, the copper loss of the copper wire is small, and the efficiency is high. Although the winding coefficient of the coil with a span greater than 1 is high, because the coil needs to be connected across the stator teeth 214, the invalid copper wire at the end will be long, the resistance will be large, and the copper loss will be high. Because of the high copper loss, the rotation efficiency of the stator is basically equal to the efficiency of the coils with the span of 1 in the present invention. For the coils of the present invention having the span of 1, the consumption of connecting wires and copper is reduced, and the coils can be bundled on the stator teeth 214, such that the rigidity of the stator teeth 214 is improved, improving the production efficiency and the use efficiency of the stator.

It should be noted that, in the present invention, the stator outer ring 213 is connected to an even number of uniformly distributed stator teeth 214, and the number of the stator slots 216 in the present invention is the same as the number of the stator teeth 214, and namely, is also an even number. In other words, the number of the stator slots 216 in the present invention is also an even number, which can reduce the unbalanced radial magnetic pull force of the stator during rotation, reduce electromagnetic vibration, and reduce the noise of the motor during use. The outer stator ring 213 is formed by a plurality of ring sector-shaped stator units 2131 connected in a chain. Each stator unit 2131 is connected to the stator tooth 214. In this embodiment, the stator unit 2131 is made of high-frequency silicon steel. By providing the stator outer ring 213 formed by a plurality of ring sector-shaped stator units 2131 connected in a chain, two chain stator outer rings 213 may be arranged crossly during machining of the stator outer ring 213. That is, the stator teeth 214 of the second stator outer ring 213 are arranged between the two stator teeth 214 of the first stator outer ring 213, which can enable a mold to produce two stator outer rings 213 by one punching. Moreover, the two stator outer rings 213 are staggered, which can greatly save silicon steel sheets compared to producing one stator outer ring 213 by once punching. In addition, since the stator outer ring 213 is chain-connected in this embodiment, a wire can be directly wound on each stator tooth 214, such that all the stator teeth 214 are wound at the same time, which improves production efficiency and avoids a process of embedding the coil in the stator slot 216. Thus, the production efficiency of the stator is improved. Moreover, the stator outer ring 213 according to the embodiment of the present invention can also enable the coils to neatly and tightly wrap the stator teeth 214, such that the stator teeth 214 can be protected as the rigidity of the stator teeth 214 is improved, and the tight coils can be reduced. In addition, it is worth mentioning that in the prior art, the winding coil 215 is embedded in the stator slot 216, and then is fixed in the stator slot 216; and in order to increase a slot fullness rate of the stator slot 216, it is required to arrange more windings. Compared with filling the coils in the stator slots 216, in the present invention, a tight winding can be acquired by winding the wires directly on the stator teeth 214, and the same slot fullness ratio can be realized with less copper wires.

Optionally, the stator outer ring 213 is formed by connecting the first stator unit 2131 and the last stator unit 2131 after the stator teeth 214 are wound, and using laser welding to connect the connecting lines of all adjacent stator units 2131.

Optionally, the circle enclosed by the arc-shaped structure of the stator teeth 214 is used to accommodate the rotor 14 having two poles.

The number of the stator teeth 214 is 6, the number of the stator slots 216 is also 6, and the number of phases of the stator is 3.

Optionally, when the number of the stator teeth 214 is 6 and the number of phases of the stator is 3, the included angles of two coils belonging to the same phase differ by 180°.

Optionally, the above six winding coils 215 are wound in a "Y" connection or delta connection manner.

In this embodiment, the number of parallel branches in the winding coils 215 belonging to the same phase is 1. That is, the head end of the first winding coil 215 in the same phase and the tail end of the second winding coil 215 in the same phase are connected, such that a branch is formed. That is, the winding coils 215 of the same phase are connected in series. The six stator coils respectively include: a first coil 2151, a second coil 2152, a third coil 2153, a fourth coil 2154, a fifth coil 2155, and a sixth coil 2156 arranged clockwise or counterclockwise along the circumferential direction of the stator outer ring 213.

The first coil 2151 and the fourth coil 2154 are set as an A phase, the second coil 2152 and the fifth coil 2155 are set as a B phase, the third coil 2153 and the sixth coil 2156 are set as a C phase, and an included angle between two coils belonging to the same phase is 180°, and two coils belonging to the same phase are separated and connected in series to form a branch.

The number of parallel branches in the winding coils 215 belonging to the same phase is 2. That is, the head end of the first winding coil 215 in the same phase and the head end of the second winding coil 215 in the same phase are connected, and the tail ends of the first winding coil 215 in the same phase and the tail end of the second winding coil 215 in the same phase are connected, such that two branches are formed. That is, the winding coils 215 in the same phase are connected in parallel.

The six stator coils respectively include: a first coil 2151, a second coil 2152, a third coil 2153, a fourth coil 2154, a fifth coil 2155, and a sixth coil 2156 arranged clockwise or counterclockwise along the circumferential direction of the stator outer ring 213. The first coil 2151 and the fourth coil 2154 are set as an A phase, the second coil 2152 and the fifth coil 2155 are set as a B phase, the third coil 2153 and the sixth coil 2156 are set as a C phase. The two coils belonging to the same phase are separated and connected in parallel to form two branches.

The yoke of the stator is provided with a semicircular hole for positioning the axial diffuser 12 of the fan. The center of the semicircular hole is set on the centerline of the stator teeth 214.

Optionally, the stator module 2 further includes a PCB 22 detachably connected to the motor stator 21. Two ends of each winding coil 215 extend along an axial direction of the motor stator 21 to the side of the motor stator 21 connected to the PCB 22. The PCB 22 is provided with a connection circuit of the winding coils 215 of the same phase, and the winding coils 215 belonging to the same phase are connected through the PCB 22. Specifically, the winding coils 215 belonging to the same phase are connected through the connection circuit of the winding coils 215 of the same phase on the PCB 22. Thus, the coils can be arranged neatly and the volume of the fan can be reduced.

In another aspect of the embodiments of the present invention, a cleaning device is also provided. The cleaning device is provided with the fan according to any one of the above embodiments.

The cleaning device in the embodiments of the present disclosure includes a cleaning robot, a hand-held vacuum cleaner, and the like.

The present invention aims to protect a fan, including: a fluid module 1 configured to generate and guide an airflow, the fluid module 1 including a diffuser 12, the diffuser 12 having a first positioning mechanism on 121; and a stator module 2 detachably connected to the diffuser 12, the stator module 2 being provided with a second positioning mechanism 211 matched with the first positioning mechanism 121. The fan adopts a modular structure, such that the assembling is simple, which is suitable for mechanized production.

It should be understood that the above specific embodiments of the present invention are only intended to illustrate or explain the principle of the present invention, but not to limit the present invention. Therefore, any modifications, equivalent replacements, improvements, etc. made without departing from the spirit and scope of the present invention should be included within the scope of protection of the present invention. Furthermore, the appended claims of the present invention are intended to cover all changes and modifications that fall within the scope and boundaries of the appended claims, or the equivalents of such scope and boundaries.

The invention claimed is:

1. A fan, comprising:
a fan blade and a diffuser, wherein the fan blade is configured to generate an airflow, and the diffuser is configured to guide the airflow and has a diffuser vane of an axial diffuser extending along an axial direction of the axial diffuser; and
a stator module, detachably connected to the diffuser, the stator module being provided with a positioning mechanism matched with the diffuser vane.

2. The fan according to claim 1, further comprising: a plain shaft, and a rotor arranged on the plain shaft in a sleeving manner; and
the rotor rotates under driving of the stator module, and accordingly drives the fan blade to rotate, thereby generating the airflow.

3. The fan according to claim 2, the axial diffuser comprising: an outer cylinder, a main body disposed in the outer cylinder, and a plurality of diffuser vanes; and
part of the diffuser vanes form the diffuser vane matched with the positioning mechanism;
the diffuser vanes connect the outer cylinder and the main body, and divide an annular space between the outer cylinder and the main body into a plurality of diffusion ducts, the main body has a central shaft hole, and the main body is arranged on the plain shaft in a sleeving manner through the central shaft hole.

4. The fan according to claim 3, wherein an outer diameter of the main body of the axial diffuser is equal to an outer diameter of the motor module, such that air flowing out of the diffusion ducts flows through outside of the motor stator.

5. The fan according to claim 1, wherein the stator module comprises:
a motor stator provided with the positioning mechanism matched with the diffuser vane.

6. The fan according to claim 5, wherein the motor stator comprises:
an annular stator outer ring, a plurality of uniformly distributed stator teeth being connected onto an inner side of the stator outer ring in a circumferential direction, and being arranged along a radial direction of the stator outer ring; and
winding coils, the number of the winding coils corresponds to the number of the stator teeth, and each stator teeth being sleeved with the winding coil,
wherein a yoke of the stator outer ring is provided with the positioning mechanism matched with the diffuser vane.

7. The fan according to claim 6, wherein the positioning mechanism is formed by the yoke of the stator outer ring recessing inward.

8. The fan according to claim 6, wherein the positioning mechanism is a positioning groove, a wall surface of the positioning groove is a cylindrical surface, the diffuser vane is a semi-cylindrical body, and a cylindrical surface matched with the wall surface of the positioning groove is arranged on a side of the diffuser vane close to the positioning groove.

9. The fan according to claim 6, wherein the stator module further comprises:
a PCB detachably connected to the motor stator;
two ends of each winding coil extend along an axial direction of the motor stator to a side of the motor stator connected to the PCB; and
the PCB is provided with a connection circuit of the winding coils of a same phase, and the winding coils belonging to the same phase are connected through the PCB.

10. A cleaning device provided with a fan, wherein the fan comprises:
a fan blade and a diffuser, wherein the fan blade is configured to generate an airflow, and the diffuser is configured to guide the airflow and has a diffuser vane of an axial diffuser extending along an axial direction of the axial diffuser; and
a stator module detachably connected to the diffuser, the stator module being provided with a positioning mechanism matched with the diffuser vane.

11. The cleaning device according to claim 10, wherein the fan further comprises: a plain shaft, and a rotor arranged on the plain shaft in a sleeving manner; and
the rotor rotates under driving of the stator module, and accordingly drives the fan blade to rotate, thereby generating the airflow.

12. The cleaning device according to claim 11, the axial diffuser comprising: an outer cylinder, a main body disposed in the outer cylinder, and a plurality of diffuser vanes; and
part of the diffuser vanes forms the diffuser vane matched with the positioning mechanism;
the diffuser vanes connect the outer cylinder and the main body, and divide an annular space between the outer cylinder and the main body into a plurality of diffusion ducts, the main body has a central shaft hole, and the main body is arranged on the plain shaft in a sleeving manner through the central shaft hole.

13. The cleaning device according to claim 12, wherein an outer diameter of the main body of the axial diffuser is equal to an outer diameter of the motor module, such that air flowing out of the diffusion ducts flows through outside of the motor stator.

14. The cleaning device according to claim 10, wherein the stator module comprises:
a motor stator provided with the positioning mechanism matched with the diffuser vane.

15. The cleaning device according to claim 14, wherein the motor stator comprises:
an annular stator outer ring, a plurality of uniformly distributed stator teeth being connected onto an inner side of the stator outer ring in a circumferential direction, and being arranged along a radial direction of the stator outer ring; and
winding coils, the number of the winding coils corresponds to the number of the stator teeth, and each stator teeth being sleeved with the winding coil,
wherein a yoke of the stator outer ring is provided with the positioning mechanism matched with the diffuser vane.

16. The cleaning device according to claim 15, wherein the positioning mechanism is formed by the yoke of the stator outer ring recessing inward.

17. The cleaning device according to claim 15, wherein the positioning mechanism is a positioning groove, a wall surface of the positioning groove is a cylindrical surface, the diffuser vane is a semi-cylindrical body, and a cylindrical surface matched with the wall surface of the positioning groove is arranged on a side of the diffuser vane close to the positioning groove.

18. The cleaning device according to claim 15, wherein the stator module further comprises:
- a PCB detachably connected to the motor stator;
- two ends of each winding coil extend along an axial direction of the motor stator to a side of the motor stator connected to the PCB; and
- the PCB is provided with a connection circuit of the winding coils of a same phase, and the winding coils belonging to the same phase are connected through the PCB.

* * * * *